Oct. 22, 1957 G. K. C. HARDESTY 2,810,225
ILLUMINATED PANEL-MODIFICATIONS OF DUO-PANEL SYSTEM
Filed July 26, 1956 2 Sheets-Sheet 1

INVENTOR
George K.C. Hardesty
BY George Sipkin
B. L. Zangwill
ATTORNEYS

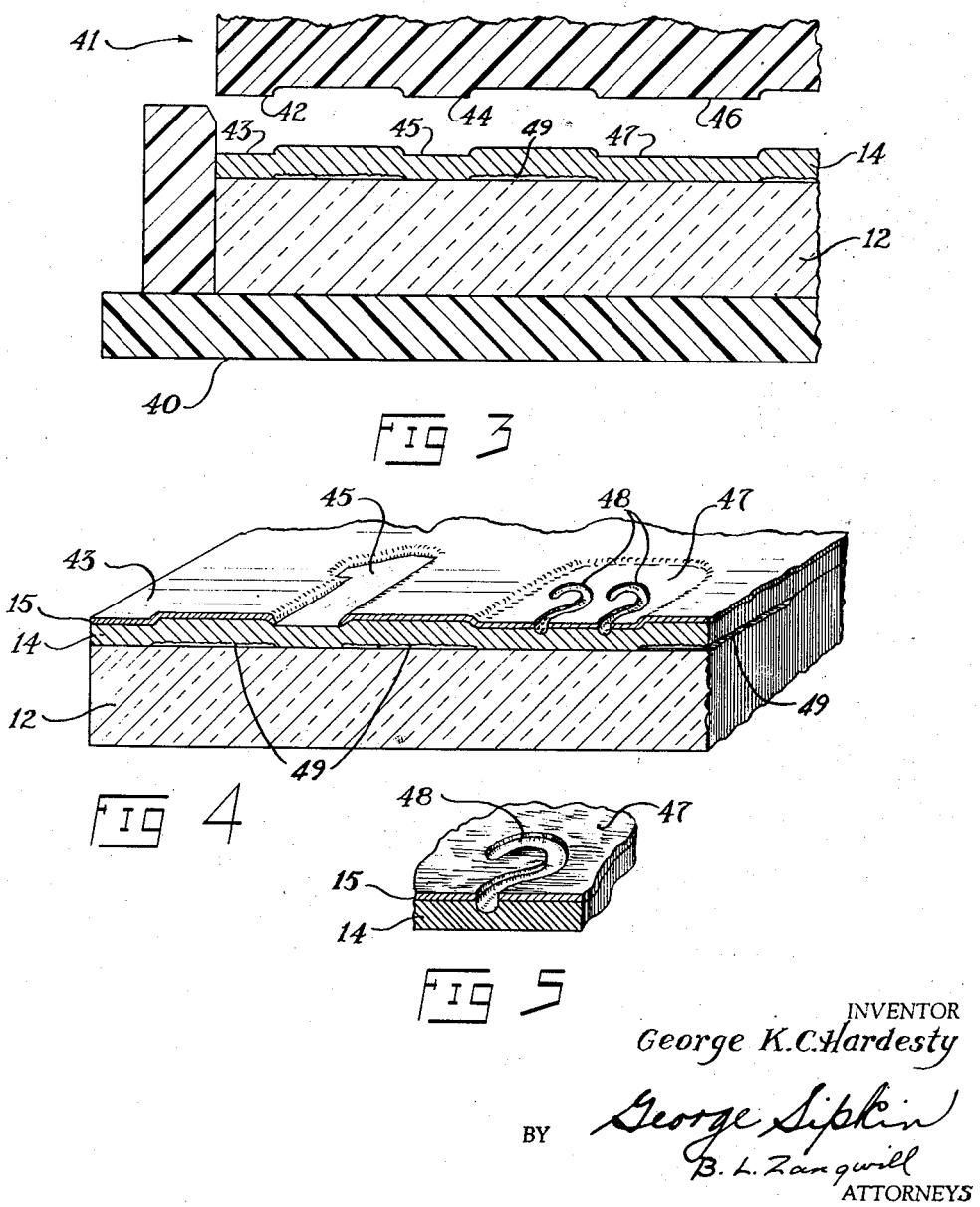

United States Patent Office

2,810,225
Patented Oct. 22, 1957

2,810,225

ILLUMINATED PANEL—MODIFICATIONS OF DUO-PANEL SYSTEM

George K. C. Hardesty, Anne Arundel County, Md.

Application July 26, 1956, Serial No. 600,358

6 Claims. (Cl. 40—130)

(Granted under Title 35, U. S. Code (1952), sec. 266)

The invention described herein may be manufactured and used by or for the Government of the United States of America for governmental purposes without the payment of any royalties thereon or therefor.

This application is a continuation-in-part of applicant's copending application Serial No. 369,976, filed July 23, 1953, for Duo-Panel Edge Illumination System.

The present invention relates to the illumination of instrument dials and panels, and, more particularly, to the provision of an efficient edge-illuminated panel which is suited for many uses aboard ships and aircraft, and in other installations having a large number of visual indicators.

For military applications, the interest seems to lie almost entirely in the edge illumination of transparent plastics. However, most of the edge-illuminated structures are inefficient. The degree of efficiency varies widely; and, in some applications, only the most efficient are of any practical value. In some applications, such as in the illuminated control panels of aircraft, there has been much patience with the inherent limitations or rather the inherent inefficiencies of the structures that have been developed, and the designer can utilize such structures only by using a relatively large number of lamps per unit of illuminated panel area.

In applicant's copending application, Serial No. 369,976, filed July 23, 1953, for Duo-Panel Edge Illumination System, referred to above, there is described an invention which has for its object the provision of an improved panel edge illumination system which is particularly suitable in locations in which the preservation of a high degree of dark adaptation of personnel is required. In that application there is described a system which operates on the principle of transmission of light through a plastic sheet by total internal reflection to a second indicia-bearing sheet which is in poor optical contact with the surfaces of the first sheet. This provides an extremely efficient system since little or no light is lost. While the duo-panel system disclosed in applicant's copending application is extremely efficient, the illuminating field is broad, and in some installations for one reason or another, such as cost of fabrication, complications in fabrication, need for structural elements of increased strength, variations in the degree of illumination of certain indicia or the like, the duo-panel system of applicant's above invention would not be the optimum choice and there is need for alternate means for illuminating instrument panels.

A general object of the present invention is the provision of an improved panel illuminating system.

A further general object of this invention is the provision of an improved method of fabricating illuminating panels.

Another object of this invention is the provision of a relatively inexpensive illuminating panel.

A further object of this invention is the provision of an illuminating panel relatively free of complications.

A further object of this invention is the provision of a relatively strong illuminating panel.

A more specific object of this invention is the provision of an illuminating panel incorporating varying degrees of optical contact, physical attachment and optical separation between interfaces of a light-transmitting panel and an indicia-forming panel.

The instant invention may be considered a modification or a further embodiment of the duo-panel system disclosed in applicant's above application, Serial No. 369,976.

The method of the instant invention is claimed in applicant's copending application Serial No. 661,268, filed May 23, 1957, for Method of Fabricating Illuminated Panels, which copending application is a division of the instant application.

Briefly, in accordance with the present invention, there is provided an illuminating panel comprising primarily a light-transmitting panel and an indicia-forming or carrying panel. The indicia panel is bonded to the light-transmitting panel at selected areas to provide either of two desired conditions: (a) significant optical contact permitting light to enter the indicia by virtue of its optical contact with the light-transmitting panel; and (b) adequate physical attachment and support for the indicia panel. In some instances, as in the indicia zones, the bond is structurally and optically significant. In other cases, as in the plain or non-indicia zones, the attachment is purely for structural reasons and some slight optical losses to the system result. The optically separated zones where optical contact is avoided are voids which, in one embodiment of the invention, may be evacuated, allowed to remain filled with air or filled with an inert gas; whereas, in a second embodiment, the would-be voids are filled with a material or structural arrangement of material generally in sheet form that is capable of maintaining a load-bearing structural relationship between the light-transmitting panel and the indicia panel without such material having significant areas of optical contact with the light-transmitting panel.

In the zones where the bond is both structurally and optically significant, the indicia are illuminated by the direct optical contact between the light-transmitting panel and the indicia-forming panel; whereas, indicia located over the voids, or over the would-be voids that are filled with the load-bearing material, will receive little or no illumination directly from the light-transmitting panel, but rather are illuminated by light reflected to them from diffusely reflecting areas located on selected portions of the rear surface of the light-transmitting panel. Thus structural strength is added to the panel and selective means for illuminating the indicia are provided.

Also, in accordance with this invention, there is provided a simplified process of obtaining selected bonding and selected optical separation between the light-transmitting panel and the indicia panel. Briefly, this process comprises the application of an embossed die in conjuction with a suitable pressure and temperature cycle in a platen press. The configuration and extent of protrusions on the plunger portion of the die determines the bonded and attached areas and the voids or optically separated areas between the two panels. Where desired, selectively bonded areas may be made as blanks for subsequent engraving of indicia thereon.

The invention, together with the above and other objects and advantages, is set forth in more technical detail in the following description and accompanying drawings, wherein:

Fig. 3 is a schematic sectional view through a portion of a platen press illustrating a means for carrying out the process of the invention;

Fig. 4 is a perspective view, partly in section, of a portion of an alluminated panel in accordance with the invention; and Fig. 5 is an enlarged perspective of a portion of the panel shown in Fig. 4.

Figure 1:
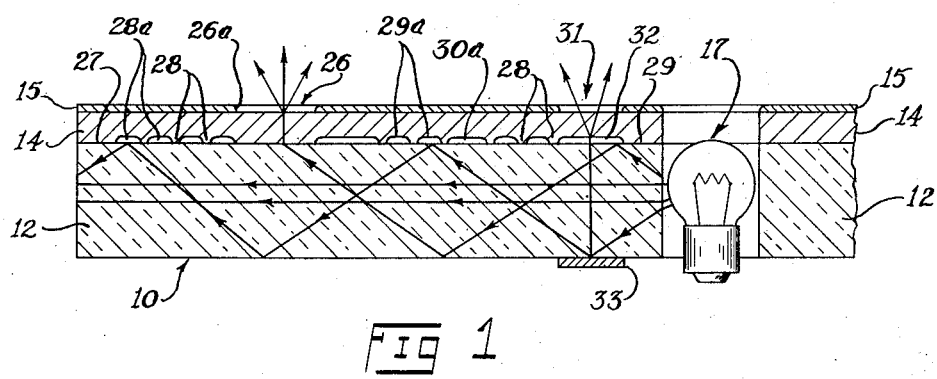
Fig. 1 is a sectional view through a portion of an illuminated panel illustrating one embodiment of the invention.

In Fig. 1 of the drawings, for purpose of illustration, the invention is shown applied to a fragment of an edge-illuminated panel particularly adapted for use aboard ships, aircraft or the like. The structure designated generally by reference numeral 10, includes a panel or light-transmitting member 12 made of a highly transparent plastic. The light-transmitting panel comprises a flat highly transparent sheet or plate of suitable size, having its front and back surfaces in parallel relation to each other and preferably polished to provide smooth optical surfaces. The light-transmitting member is preferably fabricated from an arcylic resin or methyl methacratate plastic material of the thermoplastic type such as, for example, commercial "Plexiglas" or "Lucite."

Superimposed on the light-transmitting panel is an indicia-bearing panel or lamination 14, made of a translucent light-diffusing material, preferably a white plastic. An opaque lamination or coating 15, preferably black, is superimposed on the indicia panel. Light-transmitting panel 12, indicia-forming panel 14 and opaque lamination 15 are provided with aligned openings therein for the reception of a miniature light bulb 17, which bulb is connected to a suitable source of current and may be provided with an optical filter, not shown.

As shown in Fig. 1, the indicia panel 14 is bonded to light-transmitting panel 12 at selected areas to provide either of two desired conditions. They are: (a) significant optical contact permitting light to enter the indicia such as 26 by virtue of its contact with light-transmitting panel 12; and (b) insignificant optical contact, such as zones 27, 28 and 29, where the attachment between panels 12 and 14 is to provide physical support to the indicia panel. In the first instance, as in the bonding of zone 26 of the indicia panel to the light-transmitting panel, the bond is structurally and optically significant; the indicia panel is adequately supported at this zone and light rays pass directly from the light-transmitting panel to the indicia. At indicia zone 26, the opaque lamination 15 is provided with an opening 26a for exposing the indicia to view. In the second instance, as in zones 27, 28 and 29, the attachment between panels 12 and 14 is purely for structural reason and at these zones some slight optical losses to the system result. At the zones where optical contact between panels 12 and 14 is avoided are voids 28a, 29a and 30a which may be evacuated, allowed to remain filled with air or filled with an inert gas, as desired. Thus, in accordance with this phase of the invention, indicia are provided where desired by optical contact between the panels and the indicia panel is adequately supported by the light-transmitting panel without significant optical losses.

Also, in accordance with this invention, second indicia, indicated generally at 31, is provided over void 32 between the panels. Here little or no direct illumination will be received from the light-transmitting panel, but rather from light reflected to the indicia by a diffusely reflecting patch 33 located on the rear surface of the light-transmitting panel. Generally speaking, indicia 31, which receives diffusely reflected light, will not be illuminated to the same degree of brightness as will indicia 26 which receives illumination directly from the light-transmitting panel. However, there are several variables, such as location of indicia 26 and 31 relative to the light source, relative area of optically bonded indicia and indicia located over voids, and size of the openings in the opaque lamination relative to the area of the indicia. Thus indicia may be illuminated by either or both of the two above means and the degree of illumination may be controlled by the above variables.

Figure 2:
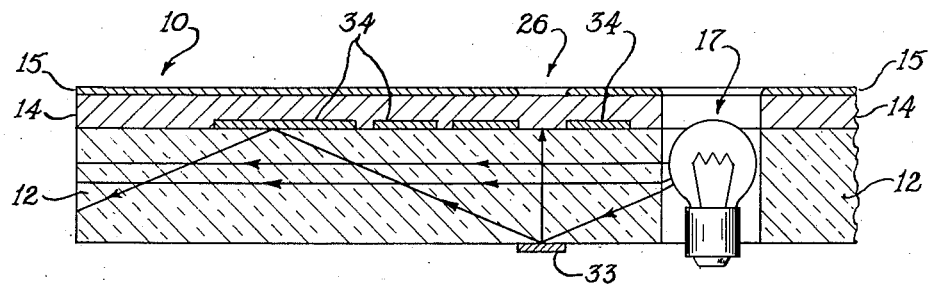
Fig. 2 is a sectional view, similar to Fig. 1, illustrating a second embodiment of the invention.

In the embodiment of the invention illustrated in Fig. 2, the same principles apply, except that the voids 28a, 29a and 30a of Fig. 1 are filled with a material or structural arrangement of material generally in sheet form, and which material, indicated at 34, is capable of maintaining a load-bearing structural relationship between light-transmitting panel 12 and indicia-forming panel 14 without having significant areas of optical contact with panel 12. This fill material 34 may be evaporated aluminum-coated glass fibers or similarly coated fiberglass cloth, or it may be a lamination of embossed plastic having a surface pattern such that avoidance of optical contact upon assembly and in subsequent use is faciliated. In the Fig. 2 embodiment of the invention only one indicia 26 is shown in optical contact with the light-transmitting panel and a diffusely reflecting patch 33 is located on the rear surface of the light-transmitting panel so that this indicia receives direct illumination from panel 12 by virtue of its optical contact therewith and diffusely reflected illumination from the patch 33. However, the patch 33 may be omitted and reliance for illumination placed on the optical contact area as in Fig. 1. Also indicia similar to 31 of Fig. 1 may be provided in the Fig. 2 embodiment by omitting the filler material 34 at such latter indicia.

Figs. 3 and 4 of the drawings illustrate in simplified form one process of obtaining selected bonding and selected optical separation between the light-transmitting panel 12 and the indicia-bearing panel 14. Here a platen press includes a base portion 40, which confines the light-transmitting panel, and a plunger portion 41, which applies pressure to selected areas of the indicia-bearing panel for bonding such areas to the light-transmitting panel. As shown, the plunger 41 has projections 42, 44 and 46 on the contact surface thereof, which projections determine the shape and size of the areas 43, 45 and 47 of the indicia-bearing panel that are bonded to the light-transmitting panel. The area 43 may be a marginal area that provides structural strength and seals the two panels together; the area 45 may be of the same configuration as the indicia and this area of bond is structurally and optically significant; and the area 47, which also is structurally and optically significant, may be formed as a blank area for subsequent engraving of indicia thereon, such as 48 (Figs. 4 and 5).

In practicing this phase of the invention, a transparent, light-transmitting panel 12 is placed within the base portion 40 of the press, then a blank indicia-bearing panel 14 is superimposed on panel 12, and then the plunger with the prearranged projections 42, 44 and 46 formed thereon is brought into contact under suitable pressure with the upper surface of panel 14. The pressure exerted by the plunger will in some instances generate sufficient heat, which, in conjunction with the exerted pressure, bond panel 14 to panel 12 at the desired areas. In other instances, depending upon the materials used and the pressures they will withstand, external heat may be applied. The opaque lamination 15 may be applied to the front or obverse surface of the indicia-bearing panel either before or after the bonding operation, as desired. As shown Figs. 3 and 4, the areas of the indicia-bearing panel upon which no appreciable pressure is applied are not in contact with the light-transmitting panel but rather are optically separated therefrom by voids 49, the size and irregular outlines of which are exaggerated.

In fabricating the panel illustrated in Fig. 2, the filler material, having solid portions and voids of desired configurations, is assembled between the interfaces of panels 12 and 14 prior to the application of heat and pressure thereto. In this manner, the areas of panel 14 that are not separated from panel 12 by such filler material are bonded thereto; some with structural and optical significance, and others with only structural significance, depending upon the extent of such areas.

Thus, it is seen, in accordance with this invention, there is provided an illuminating panel that incorporates the desirable features of the optically separated panels of applicant's copending application, Serial No. 369,976, with the several new features including the optically bonded areas between the two panels.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. An illumination system comprising, a first panel formed of transparent light-transmitting material and having upper and lower surfaces substantially in parallel relation, a second panel formed of light-diffusing material superimposed upon the upper surface of the first panel and substantially parallel thereto, said second panel having an upper surface portion with indicia means thereon and a lower surface portion thereof optically bonded to the upper surface of the first panel at selected areas thereof at least certain of which are at locations directly opposite the indicia, the lower surface of the second panel being otherwise optically separated from the first panel, and light energy means positioned adjacent said first panel for admission of light thereto for transmission therethrough, whereby light energy received in said first panel is transmitted therefrom through the certain optically bonded areas to illuminate said indicia means.

2. An illumination system as set forth in claim 1 wherein the lower surface of the second panel is optically separated from the upper surface of the first panel by voids formed between such surfaces.

3. An illumination system as set forth in claim 1 wherein the lower surface of the second panel is optically separated from the upper surface of the first panel by a filler material located between such surfaces.

4. An illumination system as set forth in claim 1 wherein said second panel has additional indicia formed on upper surface portions thereof directly opposite an optically separated portion of the first and second panels.

5. An illuminating system as set forth in claim 4 wherein the first panel has light-reflecting means selectively positioned on the lower surface thereof directly opposite the additional indicia formed on the upper surface of the second panel.

6. An illuminating system comprising, a first panel formed of light-transmitting material and having upper and lower surfaces thereof substantially in parallel relation, a second panel formed of light-diffusing material and having a lower surface thereof substantially parallel with the upper surface of the first panel, the lower surface of the second panel being optically bonded to the upper surface of the first panel at selected areas thereof and optically separated therefrom at other selected areas thereof, indicia forming means on the upper surface of the second panel opposite both optically bonded and optically separated areas of said panel, said first panel having light-reflecting means on the lower surface thereof, and means for introducing light energy into said first panel, whereby the light energy is internally reflected in said first panel for illuminating the indicia opposite optically bonded areas of the panel and diffusely reflected in an upward direction for illuminating indicia opposite the optically separated areas of the panel.

References Cited in the file of this patent

UNITED STATES PATENTS

| | | |
|---|---|---|
| 2,602,036 | Sullivan | July 1, 1952 |
| 2,660,824 | Neugass | Dec. 1, 1953 |
| 2,663,107 | Moler et al. | Dec. 22, 1953 |